(12) United States Patent
Jiang et al.

(10) Patent No.: US 10,215,100 B2
(45) Date of Patent: Feb. 26, 2019

(54) ONE DEGREE-OF-CONSTRAINT SEMI-FUSIBLE GEARBOX MOUNTING LINK

(71) Applicant: Hamilton Sundstrand Corporation, Charlotte, NC (US)

(72) Inventors: Yiwei Jiang, Rockford, IL (US); Michael R. Blewett, Stillman Valley, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 319 days.

(21) Appl. No.: 15/069,431

(22) Filed: Mar. 14, 2016

(65) Prior Publication Data

US 2017/0260909 A1 Sep. 14, 2017

(51) Int. Cl.
*F02C 7/32* (2006.01)
*F16H 57/025* (2012.01)

(52) U.S. Cl.
CPC .............. *F02C 7/32* (2013.01); *F16H 57/025* (2013.01); *F05D 2260/30* (2013.01); *F05D 2260/311* (2013.01)

(58) Field of Classification Search
CPC ........................... F02C 7/32; F05B 2260/3011
See application file for complete search history.

(56) References Cited

U.S. PATENT DOCUMENTS

| | | |
|---|---|---|
| 4,500,054 A | 2/1985 | Osborn |
| 6,212,974 B1 | 4/2001 | Van Duyn |
| 2003/0068192 A1 * | 4/2003 | Schilling .................. F02C 7/20 403/23 |
| 2004/0216461 A1 | 11/2004 | Wallace et al. |
| 2011/0239660 A1 | 10/2011 | Suciu et al. |
| 2013/0042630 A1 * | 2/2013 | Muldoon .................. F02C 7/32 60/796 |

(Continued)

FOREIGN PATENT DOCUMENTS

| | | |
|---|---|---|
| EP | 2559883 A2 | 2/2013 |
| FR | 2976623 | * 12/2012 |

OTHER PUBLICATIONS

Impact load calculation, Google Search, google.com., Jun. 9, 2018. (Year: 2018).*

(Continued)

*Primary Examiner* — Vinh Luong
(74) *Attorney, Agent, or Firm* — Kinney & Lange, P.A.

(57) ABSTRACT

A mounting link between a gas turbine engine and a gearbox comprises a gearbox arm, a fusibly breakable bolt, and two engine attachment brackets. The gearbox arm attaches to the gearbox, and extends along an axis defining a first dimension between the gas turbine engine structure and the gearbox. The fusibly breakable bolt extends through the gearbox arm, and has a central shear section that mates with the gearbox arm. The engine attachment brackets have primary and secondary retention annuli, and attachment flanges that attach to the gas turbine engine structure. The primary retention annuli are each concentric to an outer section of the fusibly breakable bolt, and have a radius selected to tightly retain those outer sections in the first dimension. The secondary retention annuli are each concentric to a portion of the shear section, and have a larger radius to loosely retain the shear section.

14 Claims, 3 Drawing Sheets

(56) References Cited

U.S. PATENT DOCUMENTS

| | | |
|---|---|---|
| 2013/0180262 A1 | 7/2013 | Duong |
| 2014/0127000 A1 | 5/2014 | Abousleiman et al. |
| 2014/0130628 A1 | 5/2014 | Abousleiman et al. |
| 2014/0133968 A1* | 5/2014 | Holchin ................ F01D 17/162 415/148 |
| 2014/0174252 A1 | 6/2014 | Davis et al. |
| 2017/0016341 A1* | 1/2017 | Stapleton .............. F01D 25/005 |
| 2017/0260908 A1* | 9/2017 | Jiang ........................ F02C 7/32 |
| 2017/0260910 A1* | 9/2017 | Jiang ........................ F02C 7/32 |

OTHER PUBLICATIONS

Extended European Search Report for EP Application No. 17156460.2, dated Oct. 10, 2017, 7 pages.

\* cited by examiner

ONE DEGREE-OF-CONSTRAINT SEMI-FUSIBLE GEARBOX MOUNTING LINK

BACKGROUND

The present invention relates generally to support structures, and more particularly to a mounting link between an engine structure and an attached structure such as an auxiliary gearbox.

Aircraft gas turbine auxiliary gearboxes are expected to withstand a variety of loads, from routine vibrational loads to sudden or extreme shocks caused by hard landings. The most extreme loads come from so-called "blade-off" events, when blades of the engine detach due to impacts or the like, causing severe shocks and often major damage to the working engines. Blade-off event loads are extremely unpredictable, but can be more than an order of magnitude stronger than any other sudden or extreme shock gas turbine engines are expected to experience, such as impacts due to hard landings. Extreme loads can cause damage to the gearbox itself, as well as to attached peripheral systems driven by the gearbox. In addition, extreme loads that damage or disconnect parts of the gearbox from the engine can result in potentially dangerous oil leakages. For all of these reasons conventional gearboxes and gearbox connections are constructed to rigidly withstand all anticipated loads.

SUMMARY

In one aspect, the present invention is directed toward a gearbox mounting link between a gas turbine engine structure and a gearbox. The gearbox mounting link comprises a gearbox arm, a fusibly breakable bolt, and first and second engine attachment brackets. The gearbox arm is configured to be attached to the gearbox, and extends along an axis defining a first degree of constraint between the gas turbine engine structure and the gearbox. The fusibly breakable bolt extends through the gearbox arm, and has a shear section disposed between outer sections of the fusibly breakable bolt. The shear section mates with the gearbox arm. The first and second engine attachment brackets each comprise an attachment flange, a primary retention annulus, and a secondary retention annulus. The attachment flanges are configured to be attached to the gas turbine engine structure. The primary retention annuli are each concentric to one of the outer sections of the fusibly breakable bolt, and have a first annular radius selected to tightly retain an outer section of the fusibly breakable bolt in the first degree of constraint. The secondary retention annuli are each concentric to a portion of the shear section, and have a second annular radius greater than the first annular radius to loosely retain the shear section in at least the first degree of constraint, in the event of the shear section separating from the outer sections.

In another aspect the, present invention is directed towards a method of attaching a gearbox to a gas turbine engine. The gearbox is attached to a gearbox arm extending along an axis defining a first degree of constraint between the gas turbine engine and the gearbox. The gas turbine engine is attached to attachment flanges of parallel first and second engine attachment brackets. The gearbox arm is secured between the first and second engine attachment brackets by means of a fusibly breakable bolt extending through the first engine attachment bracket, the gearbox arm, and the second gearbox arm, such that a shear section of the fusibly breakable bolt supports the gearbox arm. Outer sections of the fusibly breakable bolt bracketing the shear section are tightly retained along the first degree of constraint within primary retention annuli of the first and second engine attachment brackets, while the shear section itself is loosely retaining within a secondary retention annuli of the first and second engine attachment brackets.

The present summary is provided only by way of example, and not limitation. Other aspects of the present disclosure will be appreciated in view of the entirety of the present disclosure, including the entire text, claims, and accompanying figures.

Figure 1:
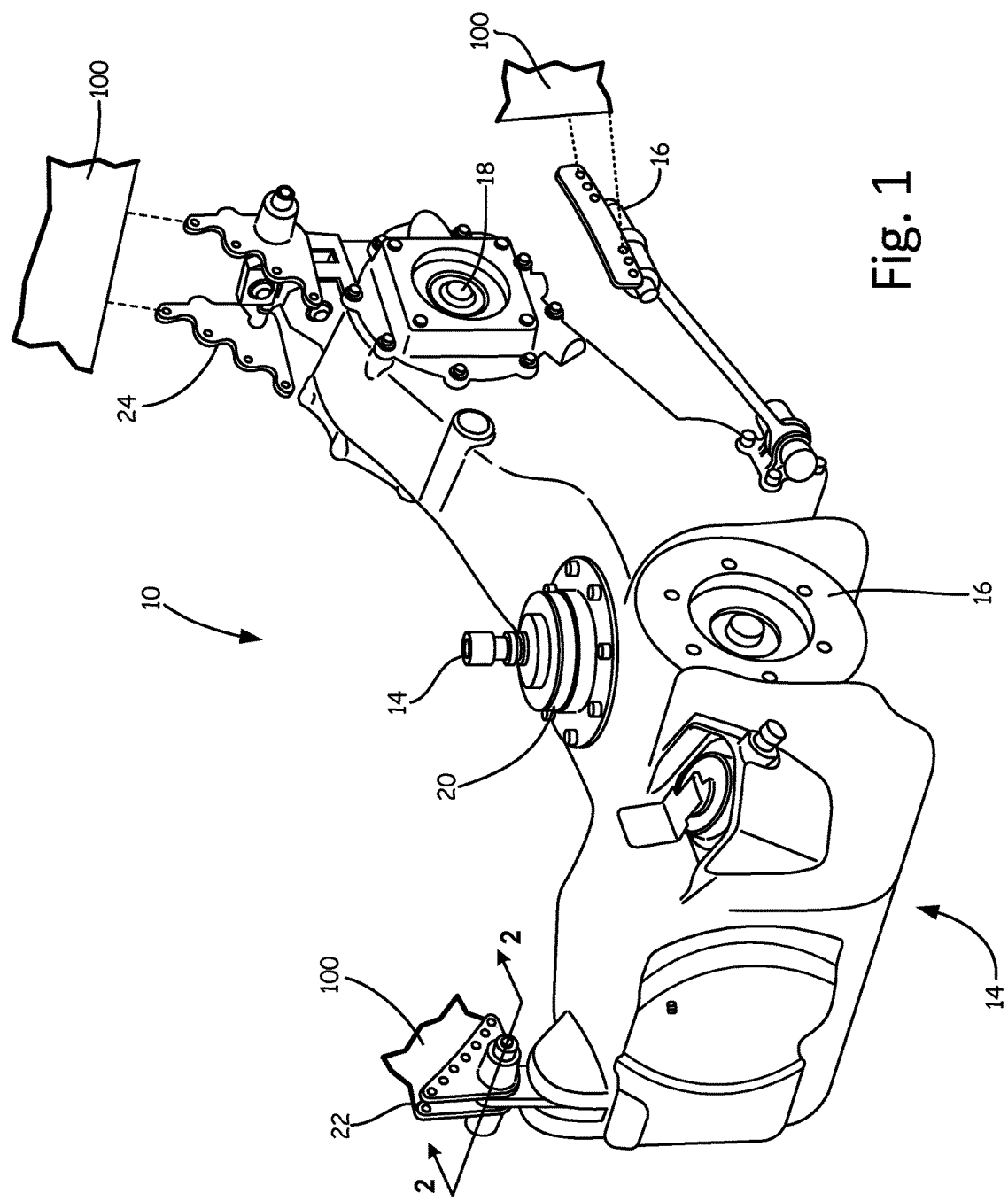
FIG. 1 is a perspective view of an auxiliary gearbox for a gas turbine engine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present invention connects an engine to an associated structure such as a gearbox via a mounting link whereby a fusibly breakable bolt with a shear section rigidly constrains one degree of freedom along a rigid connection between engine brackets that attach to the engine, and a gearbox arm that attaches to the gearbox. Extreme loads break the rigid constraint by shearing the shear section, but a secondary retention annulus defined by the engine brackets continues to loosely constrain the shear section, and consequently the gearbox arm, to a permitted range of motion. This increased mobility allows the present mounting link to absorb extreme shocks without either detaching the gearbox from the engine or transmitting potentially destructive loads from the engine to the gearbox.

FIG. 1 is a perspective view of gearbox assembly 10, which includes gearbox 12 and supporting elements sufficient to secure gearbox 12 with respect to engine 100. Engine 100 is depicted only schematically, and can, for example, be an aircraft gas turbine engine with a structural engine case, or another engine component to which gearbox 12 is secured. Gearbox assembly 10 includes driveshaft connection 14, peripheral load connections 16 and 18, seal 20, and mounting links 22, 24, and 26. Gearbox 12 can, for example, be an auxiliary gearbox disposed to transmit torque from engine 100 to a variety of peripheral loads not directly related to operation of engine 100 or to propulsion (e.g. to a generator or air circulation system).

Driveshaft connection 14 attaches to a shaft of engine 100 for torque transmission. Peripheral load connections 16 and 18 are two illustrative auxiliary driveshaft connection points for attachment of peripheral loads to gearbox 12. Peripheral loads can include any systems driven by, but not included within, engine 100, including but not limited to air circulation systems and electrical generators. Although only two peripheral load connections 16 and 18 are depicted in FIG. 1, gearbox 12 can more generally support any number and location of peripheral load connections.

Seal 20 and mounting links 22, 24, and 26 collectively constrain gearbox 12 with respect to gas turbine engine structure 100 in all six translational and rotational degrees of freedom, without overconstraining gearbox 12. Seal 20 can, for example, be a spigot-type annular seal that constrains gearbox 12 in two degrees of freedom corresponding to the normal basis of the reference plane on which seal 20 lies. In the depicted embodiment, mounting links 22 and 26 each provide a single independent degree of constraint, while mounting link 24 provides two more independent degrees of constraint. More generally, the collection of all linkages connecting gearbox 12 to engine 100 (including seal 20, as well as provides a total of six independent constraints on the translational and rotational freedom of gearbox 12 with respect to engine 100. In alternative embodiments, these constraints can be distributed about more or fewer separate linkages. The independence of these constraints prevents overconstraint (e.g. two links constraining the same degree of freedom) that would necessitate tighter tolerances and could increase damage done to the gearbox and/or the linkages in the event of severe impacts. The locations and number of degrees of freedom constrained by each linkage may vary across different embodiments, so long as the collection of all linkages constrains all six degrees of freedom without significantly overconstraining any.

Figure 2:
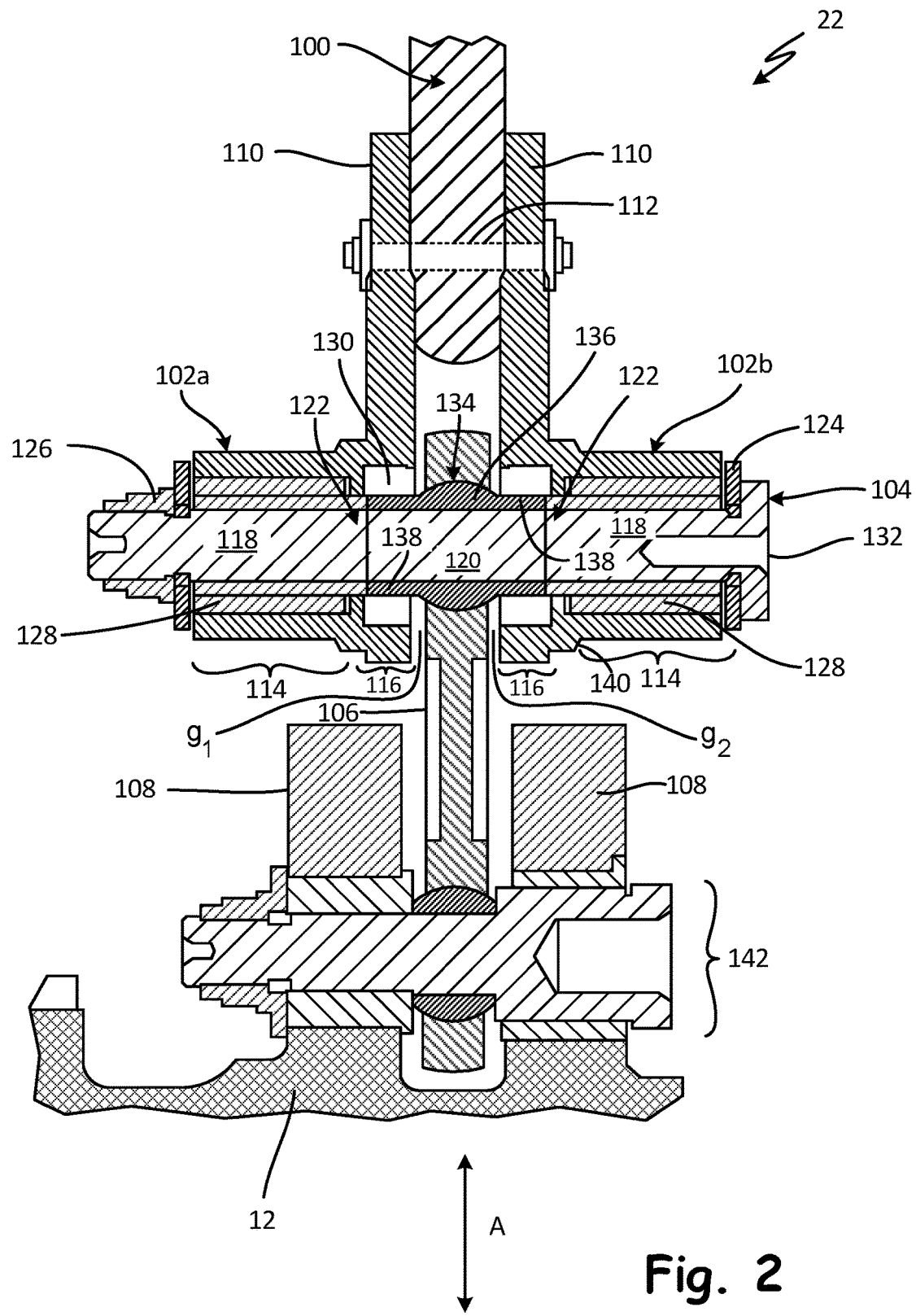
FIG. 2 is a cross-sectional view of a mounting link between the gas turbine engine and the auxiliary gearbox, in an ordinary operating state, taken through section plane 2-2 of FIG. 1.

FIG. 2 is a cross-sectional view of an embodiment of mounting link 22, through section plane 2-2 of FIG. 1. FIG. 2 illustrates gearbox 12, engine 100, engine attachment brackets 102a and 102b (collectively referred to hereinafter as engine attachment brackets 102), frangible shear member 104 (collectively or alternatively referred to hereinafter as fusibly breakable bolt 104), gearbox arm 106, gearbox attachment structure 108, attachment flanges 110, engine fastener assembly 112, primary retention annulus 114, secondary retention annulus 116, outer bolt sections 118, frangible, or shear section 120, shear grooves 122, washers 124, nut 126, primary dampers 128, secondary dampers 130, bearing 134, spherical bearing section 136, secondary support lands 138, shear encourager 140, and gearbox fastener assembly 142.

Mounting link 22 supports and constrains motion of gearbox 12 relative to engine 100 along axis A, which defines a constrained degree of freedom. Fusibly breakable bolt 104 connects gearbox arm 106 to engine attachment brackets 102, which attach to gearbox 12 and engine 100, via gearbox fastener assembly 142 and engine fastener assembly 112, respectively.

Engine attachment brackets 102a and 102b are separate mirror image elements that sandwich and attach to engine 100, and extend along axis A away from engine 100 to support and retain fusibly breakable bolt 104. Engine attachment brackets 102 include attachment flanges 110, which abut a retention structure (e.g. flange or strut) of engine 100 and are secured to engine 100 via engine fastener assembly 112. In the illustrated embodiment engine fastener assembly 112 includes at least one rod, pin, or bolt secured through attachment flanges 110 and engine 100. In other embodiments, fastener assembly 112 can for example include a bearing arrangement, seal, or other rigid connection between engine 110 and attachment flanges 110.

Gearbox arm 106 is depicted as a webbed or flanged arm extending along axis A from frangible shear member 104 to gearbox 12. Frangible shear member 104 is a rigid, unitary, and monolithic support bolt extending through gearbox arm 106 and both engine attachment brackets 102, secured via nut 126, and spaced with respect to engine attachment brackets 102 via washers 124. Frangible shear member 104 includes outer bolt sections 118 and frangible section 120. Frangible section 120 is located between engine attachment brackets 102, and outer bolt sections 118 extend laterally from frangible section 120 through engine attachment brackets 102. Frangible section 120 can, in some embodiments, be defined by shear grooves 122 that pre-define locations of shear planes where a sufficiently strong shock or heavy load will cause shear section 120 to separate from outer bolt sections 118. Engine attachment brackets 102, frangible shear member 104, and gearbox arm 106 are all formed from rigid, non-compressible materials such as a steel alloy. In some embodiments, frangible shear member 104 can be formed of a less durable material than engine attachment brackets 102 and gearbox arm 106.

Engine attachment brackets 102 each include primary and secondary retention annuli 114 and 116, respectively. Primary retention annuli 114 are concentric with outer sections 118 of frangible shear member 104, and retain frangible shear member 104 during ordinary operating conditions. Each primary retention annulus 114 retains one outer bolt section 118, and either immediately abuts frangible shear member 104, or is separated from frangible shear member 104 only by primary damper 128. In the illustrated embodiment, primary dampers 128 formed of a resilient material such as rubber are recessed within and partially define primary retention annulus 114, so as to reduce vibration transmission through mounting link to gearbox 12. The separation distance between outer sections 118 of frangible shear member 104 and primary retention annuli 114 is no greater than required for tolerances; primary retention annuli tightly constrain any movement of frangible shear member 104 along axis A, and thereby of gearbox arm 106 and gearbox 12 in this single degree of freedom.

Secondary retention annuli 116 are concentric with and laterally aligned with portions of frangible section 120 of frangible shear member 104, and loosely retain frangible section 120 in the event of an impact or other load sufficient to shear frangible shear member 104 along planes defined by shear grooves 122, thereby separating frangible section 120 from outer sections 118. In the depicted embodiment, frangible section 120 is surrounded by bearing 134 with spherical section 136 and cylindrical support lands 138. Cylindrical support lands 138 are disposed concentrically within secondary retention annuli 116, while spherical section 136 is situated between secondary retention annuli 116 and supports gearbox arm 106 via a pivotable connection that permits at least some angular deflection of gearbox arm 106 away from (e.g. orthogonal to) axis A. One of the first and second engine attachment brackets 102a, 102b is separated from gearbox arm 106 by a gap of a first gap width $g_1$, and from the other of the first and second engine attachment brackets 102a, 102b by a second gap width $g_2$, such that second gap width $g_2$ is greater than a corresponding width of spherical bearing 136 in the same dimension, In particular, this spherical bearing connection between frangible section 120 and gearbox arm 106 permits gearbox arm 106 to deflect relative to engine attachment brackets 102 in a direction other than that defined by axis A. This deflection is further permitted by the separation of engine attachment brackets 102, which can be substantially equal to the corresponding width of spherical section 136 in the same direction, and which is greater than the width of gearbox arm 106.

In the illustrated embodiment, secondary retention annuli 116 have secondary annulus widths $w_2$ equal to a lateral width of corresponding secondary support lands. Secondary retention annuli 116 are separated from a normal operating position of fusibly breakable bolt by secondary separation distance $d_2$, such that secondary retention annuli 116 only make contact with shear section 120 (via secondary support lands 138) when shear section 120 has separated from primary outer sections 118. Cylindrical support lands 138 can hold secondary dampers 128, which mitigate vibration transmission from engine attachment brackets 102 to shear section 120 in the event that shear section 120 separates from outer sections 118 of fusibly breakable bolt 132.

Figure 3:
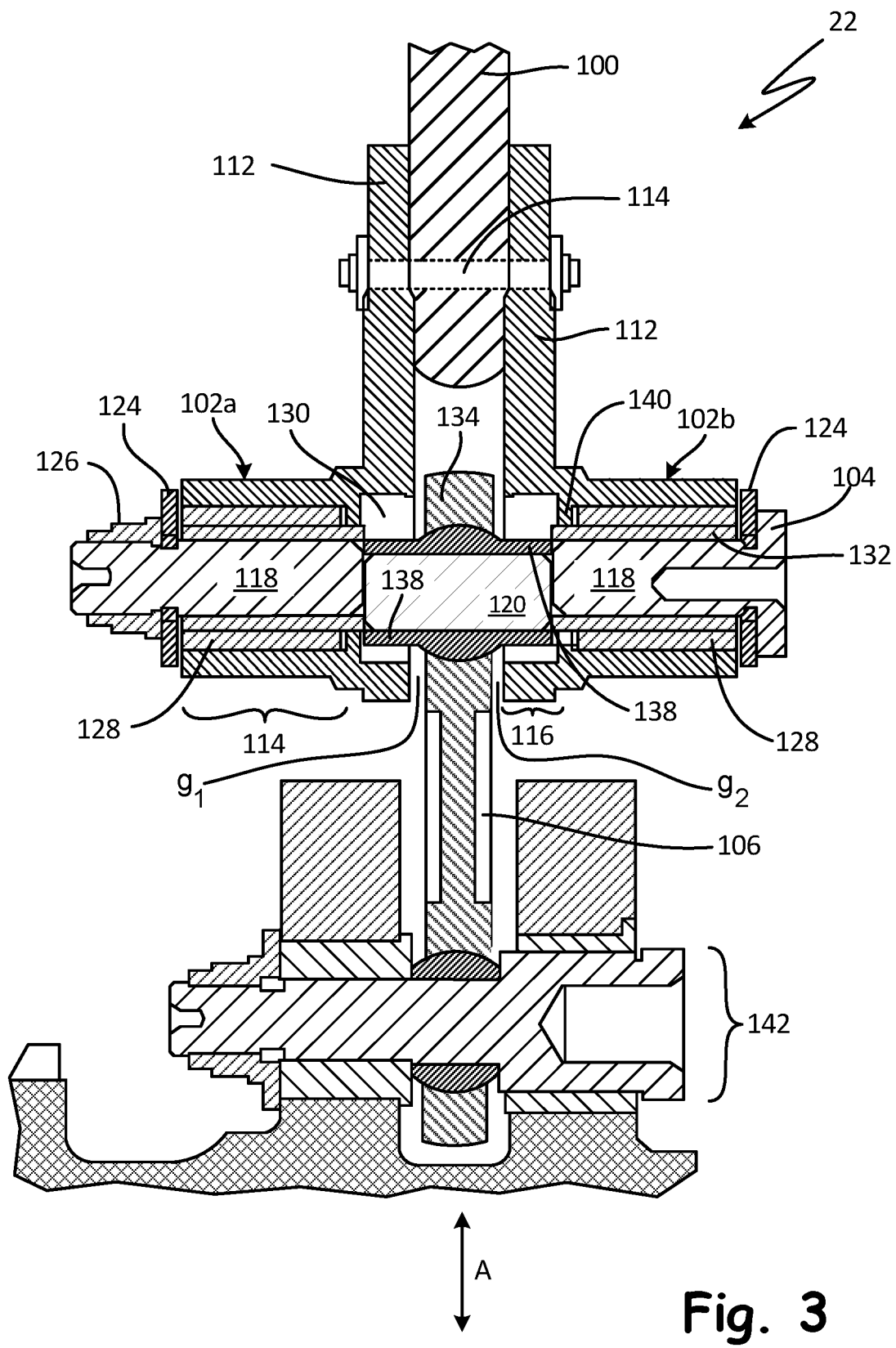
FIG. 3 is a cross-sectional view of the mounting link of FIG. 2 in a loose retention state after shear section failure in response to extreme loads.

FIG. 3 is a cross-sectional view of mounting link 22 through section plane 2-2, illustrating the operation of mounting link 22 once shear section 120 has broken away from outer sections 118 of fusibly breakable bolt. All elements depicted in FIG. 3 are otherwise as described above with respect to FIG. 2.

As stated above, fusibly breakable bolt 104 connects engine attachment brackets 102 to gearbox arm 106. Fusibly breakable bolt 104 allows mounting link 22 to continue to at least loosely constrain motion of gearbox 12 along axis A relative to engine 100, even in the event of extreme shocks or other loads sufficient to separate shear section 120 from outer sections 118. In this way, mounting link 22 limits or prevents damage that could otherwise be done to gearbox 12 and its attached peripherals by transmitting such extreme loads, while simultaneously helping to prevent gearbox 12 from detaching from engine 100.

Fusibly breakable bolt 104 is designed to shear at a known load magnitude corresponding to the maximum structural capability of the gearbox assembly 12, the unfused mount components, and the engine mounting structure 100. This can be accomplished by selecting an appropriately durable diameter and material for fusibly separable bolt, and/or by priming fusibly breakable bolt 104 for shear with suitably shaped shear grooves 122. In general, fusibly breakable bolt 104 must be at least strong enough to withstand peak non-destructive impact loads such as low cycle loads from hard landings and other non-routine but expected shocks. These loads can, for example, reach 10-15 Gs. In at least some embodiments, fusibly breakable bolt 104 will not break until loads at least 10-25 times higher than expected low cycle loads. Very few loads experienced during aircraft engine operation reach these levels, but shocks due to blade-off events can be high enough to shear fusibly breakable bolt 104. Embodiments of mounting link 22 wherein primary retention annuli 114 include primary dampers 128 can have shear encouragers 140. Shear encouragers 140 are non-damped (and accordingly more rigid) sections of primary retention annuli situated immediately adjacent shear section 120, i.e. at shear grooves 122, to promote shear at correct locations on fusibly breakable bolt 104.

Once shear section 120 of fusibly breakable bolt 104 has broken away from outer sections 118, it remains retained within secondary retention annuli 116 of engine attachment brackets 102, albeit more loosely than outer sections 118 are constantly retained within primary retention annuli 114. Thus, shear section 120 is able to translate axially along axis A. This increased mechanical play of shear section 118, and therefore of gearbox arm 106 and gearbox 12, allows mounting link 22 to dissipate extreme shocks from engine 100. In this way, the present invention rigidly restrains gearbox 12 with respect to engine 100 in a degree of freedom defined by axis A during normal operating conditions, but avoids transmitting destructive loads. This approach obviates the need for all linkages and peripheral connections to be capable of surviving the extreme loads produced during fan blade-off events, which would otherwise either be entirely infeasible, or would dramatically increase the weight and mass of material required to adequately reinforce associated systems. Fan blade-off events necessitate maintenance to repair or replace damaged engine components, and fusibly breakable bolt 104 can be replaced with an intact bolt during maintenance following any shock sufficient to break shear section 120 away from outer sections 118.

Discussion of Possible Embodiments

The following are non-exclusive descriptions of possible embodiments of the present invention.

A gearbox mounting link between a gas turbine engine structure and a gearbox, the mounting link comprising: a gearbox arm configured to be attached to the gearbox, and extending along an axis defining a first degree of constraint between the gas turbine engine structure and the gearbox; a fusibly breakable member extending through the gearbox arm, and having a shear section that mates with the gearbox arm, the shear section disposed between a first outer section and a second outer section of the fusibly breakable member; first and second engine attachment brackets, each comprising: an attachment flange configured to be attached to the gas turbine engine structure; a primary retention annulus concentric to one of the outer sections of the fusibly breakable member, and having a first annular radius selected to tightly retain an outer section of the fusibly breakable member in the first degree of constraint; and a secondary retention annulus concentric to a portion of the shear section, and having a second annular radius greater than the first annular radius to loosely retain the shear section in at least the first degree of constraint, in the event of the shear section separating from the outer sections.

The gearbox mounting link of the preceding paragraph can optionally include, additionally and/or alternatively, any one or more of the following features, configurations and/or additional components:

A further embodiment of the foregoing gearbox mounting link, wherein the fusibly breakable bolt is a single integrally formed element with shear grooves defining the shear section.

A further embodiment of the foregoing gearbox mounting link, further comprising primary damper elements surrounding at least a portion of each outer section of the fusibly breakable bolt, and disposed between the fusibly breakable bolt and the primary retention annulus.

A further embodiment of the foregoing gearbox mounting link, further comprising a central spherical bearing disposed about the shear section, between the shear section and the gearbox arm, A further embodiment of the foregoing gearbox mounting link, wherein the spherical bearing is bracketed by cylindrical secondary support lands disposed concentrically within the secondary retention annuli of the respective first and second engine attachment brackets.

A further embodiment of the foregoing gearbox mounting link, wherein the secondary support annuli and the cylindrical secondary support lands have substantially the same width.

A further embodiment of the foregoing gearbox mounting link, further comprising secondary damper elements situated within the secondary retention annuli and facing the cylindrical secondary support lands.

A further embodiment of the foregoing gearbox mounting link, wherein each engine attachment brackets is separated from the gearbox arm by a gap of a first gap width, and from the other engine attachment bracket by a second gap width, such that the second gap width is greater than a corresponding width of the spherical bearing in the same dimension, such that the spherical bearing permits the gearbox arm to deflect relative to the engine attachment brackets in a direction other than that defined by the first degree of constraint.

A further embodiment of the foregoing gearbox mounting link, wherein the fusibly breakable bolt is rated to shear at a load at least ten times greater than a peak non-destructive impact load of the gas turbine engine.

A further embodiment of the foregoing gearbox mounting link, wherein the fusibly breakable bolt is rated to shear at a load less than a predicted fan blade-off load of the gas turbine engine.

A method of attaching a gearbox to a gas turbine engine, the method comprising:

attaching the gearbox to a gearbox arm extending along an axis defining a first degree of constraint between the gas turbine engine and the gearbox; attaching the gas turbine engine to attachment flanges of parallel first and second engine attachment brackets; securing the gearbox arm between the first and second engine attachment brackets by means of a fusibly breakable bolt extending through the first engine attachment bracket, the gearbox arm, and the second gearbox arm, such that a shear section of the fusibly breakable bolt supports the gearbox arm, while outer sections of the fusibly breakable bolt bracketing the shear section are tightly retained along the first degree of constraint within primary retention annuli of the first and second engine attachment brackets; and loosely retaining the shear section within a secondary retention annuli of the first and second engine attachment brackets.

The method of the preceding paragraph can optionally include, additionally and/or alternatively, any one or more of the following features, configurations and/or additional components:

A further embodiment of the foregoing method, further comprising replacing fusibly breakable bolt after the shear section separates from the outer sections, during subsequent maintenance.

A further embodiment of the foregoing method, further comprising securing a spherical bearing about the shear section, between the fusibly breakable bolt and the gearbox arm, and between the secondary retention annuli of the first and second engine attachment brackets.

A further embodiment of the foregoing method, further comprising damping the primary retention annuli against routine operating vibration.

A gearbox-to-engine mounting arrangement comprising: a gearbox arm attached to the gearbox; a pair of engine attachment brackets attached to the engine and straddling the gearbox arm; and a breakable member extending through the pair of engine attachment brackets and the gearbox arm having a shear section and two outer sections, the shear section being detachable from the outer sections, the outer sections being positioned radially within the pair of engine attachment brackets and the shear section being positioned partially radially within the gearbox arm and partially radially within the pair of engine attachment brackets such that the shear section and the gearbox arm are able to move a greater selected dimension relative to the pair of engine attachment brackets after the shear section has detached from the outer sections than before the shear section has detached from the outer sections.

The gearbox-to-engine mounting arrangement of the preceding paragraph can optionally include, additionally and/or alternatively, any one or more of the following features, configurations and/or additional components:

A further embodiment of the foregoing gearbox-to-engine mounting arrangement, wherein the gearbox arm comprises primary retention annuli disposed about the outer sections, and secondary retention annuli disposed about the shear section.

A further embodiment of the foregoing gearbox-to-engine mounting arrangement, wherein the secondary retention annuli have a greater radius than the primary retention annuli.

A further embodiment of the foregoing gearbox-to-engine mounting arrangement, wherein the breakable member is a substantially cylindrical element having shear grooves separating the shear section from the outer sections.

A further embodiment of the foregoing gearbox-to-engine mounting arrangement, wherein the gearbox arm attaches to the shear section via a spherical bearing.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gearbox mounting link between a gas turbine engine structure and a gearbox, the mounting link comprising:
   a gearbox arm configured to be attached to the gearbox, and extending along an axis defining a first degree of constraint between the gas turbine engine structure and the gearbox;
   first and second engine attachment brackets, each comprising:
      an attachment flange configured to be attached to the gas turbine engine structure;
      a primary retention annulus having a first annular radius; and
      a secondary retention annulus having a second annular radius greater than the first annular radius; and a frangible shear member extending through the gearbox arm, and having a frangible section disposed between, and configured to break relative to, a first outer section and a second outer section of the frangible shear member, the frangible section mating with the gearbox arm between the first and second engine attachment brackets;

wherein the primary retention annulus is concentric to one of the first and second outer sections of the frangible shear member and the secondary retention annulus is concentric to a portion of the frangible section; and wherein the first annular radius is sized to retain the one of the first and second outer sections of the frangible shear member along the first degree of constraint, and upon breakage of the frangible section from one of the first and second outer sections, the second annular radius is sized to retain the frangible section in at least the first degree of constraint.

2. The gearbox mounting link of claim 1, wherein the frangible shear member is a single integrally formed element with shear grooves defining the shear section.

3. The gearbox mounting link of claim 1, further comprising primary damper elements surrounding at least a portion of each outer section of the frangible shear member, and disposed between the frangible shear member and the primary retention annulus.

4. The gearbox mounting link of claim 1, further comprising a central spherical bearing disposed about the shear section, between the shear section and the gearbox arm.

5. The gearbox mounting link of claim 4, wherein the spherical bearing is bracketed by cylindrical secondary support lands disposed concentrically within the secondary retention annuli of the respective first and second engine attachment brackets.

6. The gearbox mounting link of claim 5, wherein the secondary support annuli and the cylindrical secondary support lands have substantially the same width.

7. The gearbox mounting link of claim 5, further comprising secondary damper elements situated within the secondary retention annuli and facing the cylindrical secondary support lands.

8. The gearbox mounting link of claim 4, wherein one of the first and second engine attachment brackets is separated from the gearbox arm by a gap of a first gap width $g_1$, and from the other of the first and second engine attachment brackets by a second gap width $g_2$, such that the second gap width $g_2$ is greater than a corresponding width of the spherical bearing in the same dimension, such that the spherical bearing permits the gearbox arm to deflect relative to the first and second engine attachment brackets in a direction other than that defined by the first degree of constraint.

9. The gearbox mounting link of claim 1, wherein the frangible shear member is rated to shear at a load at least ten times greater than a peak non-destructive impact load of the gas turbine engine.

10. The gearbox mounting link of claim 9, wherein the frangible shear member is rated to shear at a load less than a predicted fan blade-off shear load of the gas turbine engine.

11. A method of attaching a gearbox to a gas turbine engine, the method comprising:

attaching the gearbox to a gearbox arm portion of a mounting link between the gearbox and the gas turbine, such that the gearbox arm extends along an axis defining a first degree of constraint between the gas turbine engine and the gearbox;

attaching the gas turbine engine to first and second engine attachment brackets of the mounting link, each attachment bracket comprising:

an attachment flange configured to be attached to the gas turbine engine structure;

a primary retention annulus having a first annular radius; and a secondary retention annulus having a second annular radius greater than the first annular radius;

securing the gearbox arm between the first and second engine attachment brackets by means of a frangible shear member having a frangible section disposed between, and configured to break relative to, a first outer section and a second outer section of the frangible shear member, the frangible shear member extending through the first engine attachment bracket, the gearbox arm, and the second, engine attachment bracket, such that the frangible section of the frangible shear member supports the gearbox arm, while the first and second outer sections of the frangible shear member wherein the primary retention annulus is concentric to one of the first and second outer sections of the frangible shear member and the secondary retention annulus is concentric to a portion of the frangible section; and wherein the first annular radius is sized to retain the one of the first and second outer sections of the frangible shear member along the first degree of constraint, and upon breakage of the frangible section from one of the first and second outer sections, the second annular radius is sized to retain the frangible section in at least the first degree of constraint.

12. The method of claim 11, further comprising replacing the frangible shear member after the shear section separates from one of the first and second outer sections, during subsequent maintenance.

13. The method of claim 11, further comprising securing a central spherical bearing about the shear section, between the frangible shear member and the gearbox arm, and between the secondary retention annuli of the first and second engine attachment brackets.

14. The method of claim 11, further comprising damping the primary retention annuli against routine operating vibration.

* * * * *